United States Patent [19]
Hocevar et al.

[11] Patent Number: 6,002,438
[45] Date of Patent: Dec. 14, 1999

[54] METHOD AND APPARATUS FOR STORING DECODED VIDEO INFORMATION

[75] Inventors: Dale E. Hocevar, Plano; Yetung Paul Chiang, Richardson, both of Tex.

[73] Assignee: Texas Instruments Incorporated, Dallas, Tex.

[21] Appl. No.: 08/953,011

[22] Filed: Oct. 16, 1997

Related U.S. Application Data

[60] Provisional application No. 60/029,315, Oct. 25, 1996.

[51] Int. Cl.$^6$ ...................................................... H04N 7/50
[52] U.S. Cl. .......................... 348/402; 348/402; 348/716
[58] Field of Search .................................... 348/384, 390, 348/402, 415, 416, 424, 716; H04N 7/50

[56] References Cited

U.S. PATENT DOCUMENTS

| | | | |
|---|---|---|---|
| 5,262,854 | 11/1993 | Ng | 348/416 |
| 5,581,302 | 12/1996 | Ran | 348/416 |
| 5,635,985 | 6/1997 | Boyce | 348/402 |
| 5,777,677 | 7/1998 | Linzer | 348/415 |

*Primary Examiner*—Howard Britton
*Attorney, Agent, or Firm*—Robert D. Marshall, Jr.; Gerald E. Laws; Richard L. Donaldson

[57] ABSTRACT

A decoded video signal which was encoded in accordance with a standard, such as MPEG-2, is encoded "on the fly" using a lossless linear predicted coding technique and stored in a compressed form in a RAM. A separate encoding technique is provided for B pictures and for I or P pictures. The compressed B pictures are decompressed for display. The compressed I or P pictures are decompressed for display or for use in decoding other P or B pictures.

12 Claims, 3 Drawing Sheets

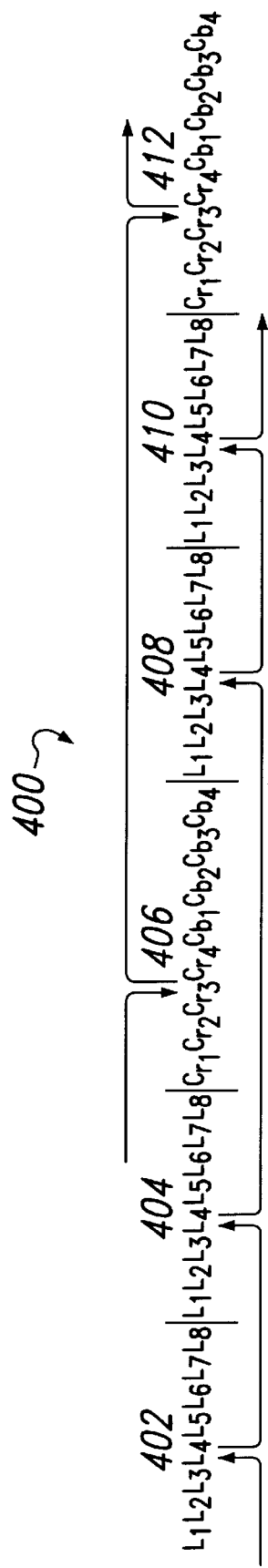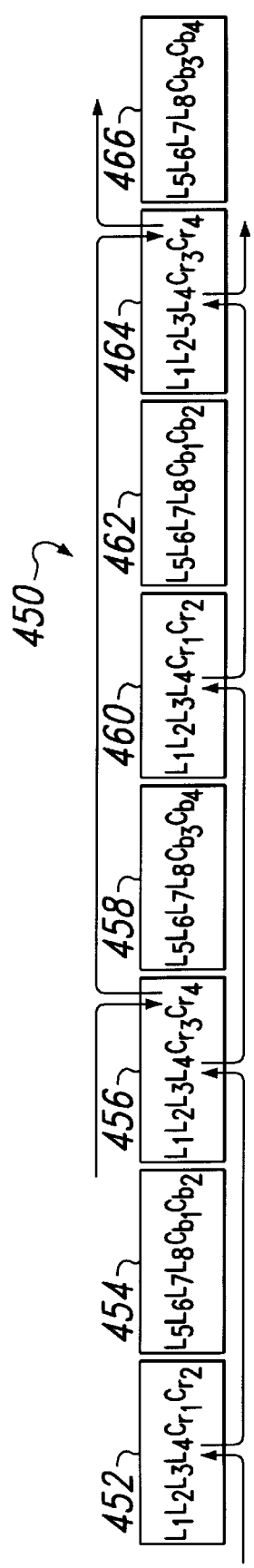

METHOD AND APPARATUS FOR STORING DECODED VIDEO INFORMATION

This application claims priority under 35 USC 119 (e) (1) of the provisional application Ser. No. 60/029,315, Filed Oct. 25, 1996.

BACKGROUND OF THE INVENTION

The utilization of compressed video utilizing standards such as MPEG-2 have enabled video to penetrate consumer markets that would otherwise be impossible. Compressed video can now be encoded onto a CD-ROM or be transmitted via satellite communications using small 18-inch satellite dishes, for example. The use of motion compensated compressed video such as found in MPEG-2 requires the storage of reference frames for the decoding of the motion compensation encoded frames. For example, in MPEG-2 encoded video, three types of pictures are utilized. Intrapictures (I Pictures) provide access points for random access but only with moderate compression. Predicted pictures (P Pictures) are coded with reference to a past picture which can be an I Picture or a P Picture and in general are used as a reference for future predicted pictures. Bidirectionally predicted pictures (B Pictures) provide the highest amount of compression but require both a past and a future reference for prediction. These pictures can never be used as a reference. In a series of pictures which are to be displayed in the following order:

$IB_1B_2P_1B_3B_4P_2$ where I represents an I Picture, P represents a P Picture and B represents a B Picture, he pictures would have to be decoded in the following order:

$IP_1B_1B_2P_2B_3B_4$.

This requires that I and P Pictures be stored in order that they can be utilized for decoding B Pictures. If the B Pictures can be decoded and displayed on the fly, then it is not necessary to store these pictures. If they cannot, B Pictures must also be stored. If the pictures are sent on a frame basis rather than a field basis, then decoding of the B picture on the fly will still require the storing of at least the not yet displayed field, and more commonly a portion of the displayed field as well. This information is typically stored in a RAM. As is well known, RAM memories are available in discrete sizes. If a conventional memory allocation technique is utilized, the size of the RAM memory that is required will exceed one size of memory by a small amount, thus requiring a system which utilizes approximately twice the necessary memory. In a consumer product, the cost of this additional memory unnecessarily increases the cost of the consumer device thereby making such products non-competitive in the marketplace and/or increasing the price of the device beyond what consumers are willing to pay.

Accordingly, there is a need for a technique to reduce the amount of memory needed to store the information necessary to decode such encoded pictures.

SUMMARY OF THE INVENTION

It is a general object of the present invention to reduce the requirements for storing video image data for use in decoding encoded video pictures.

It is a further object of the present invention to reduce the amount of memory needed to store I, P and B pictures encoded in accordance with the MPEG-2 standard.

A still further object of the present invention is to reduce the amount of memory needed to store I, P or B pictures in accordance with MPEG-2 standard in a lossless manner.

Yet another object of the present invention is to provide lossless compression/decompression of video pictures "on the fly".

These and other objects, advantages and features are provided, in accordance with one aspect of the present invention by a method of decoding a video signal encoded in accordance with a standard which requires storing at least a portion of a picture for later use. Video information for at least a portion of a reference picture is dynamically compressed. The dynamically compressed video information is stored a memory.

Another aspect of the invention comprises apparatus for storing decoded video information of a video signal encoded in accordance with a standard which requires storing at least a portion of a picture for later use. A video signal processor dynamically compresses video information for at least a portion of a reference picture. A memory stores the dynamically compressed video information.

A further aspect of the invention includes a method of storing B picture information encoded in accordance with an MPEG standard. The decoded macroblock by macroblock picture data is utilized to generate data representative of a physical slice of the picture. The physical slice data is encoded utilizing a lossless predictive coding method to generate encoded picture data. The encoded picture data is stored linearly in a memory.

Yet another aspect of the invention includes apparatus for storing decoded video information for a B picture of a video signal encoded in accordance with an MPEG standard. A video signal processor utilizes the decoded macroblock by macroblock picture data to generate data representative of a physical slice of the picture. An encoder encodes the physical slice data utilizing a lossless predictive coding method. A memory stores the encoded picture data in a linear manner.

A still further aspect of the invention comprises a method of storing I or P picture information encoded in accordance with an MPEG standard. Picture data is encoded utilizing a lossless predictive coding method on a block by block basis to generate encoded picture data. The encoded picture data is stored linearly in a memory. A pointer table of the beginning of data for each individual block is generated and stored.

Another aspect of the invention includes apparatus for storing decoded video information for an I or P picture of a video signal encoded in accordance with an MPEG standard. An encoder encoding picture data utilizing a lossless predictive coding method on a block by block basis to generate encoded picture data. A memory stores the encoded picture data in a linear manner. A processor generates and stores a pointer table of the beginning of data for each individual block.

A further aspect of the invention includes a method of decoding a video signal encoded in accordance with a standard in which a picture is stored for later use. The decoded macroblock by macroblock picture data is utilized to generate data representative of a physical slice of the picture. The physical slice data is encoded utilizing a lossless predictive coding method to generate encoded picture data. The encoded picture data is stored linearly in a memory.

Another aspect of the invention comprises apparatus for storing decoded video information for a picture of a video signal encoded in accordance with a standard for later display. A video signal processor utilizes the decoded macroblock by macroblock picture data to generate data representative of a physical slice of the picture. An encoder encodes the physical slice data utilizing a lossless predictive coding method. A memory stores the encoded picture data in a linear manner.

BRIEF DESCRIPTION OF THE DRAWINGS

FIG. 4 A illustrates the interleaving of luminance and chrominance information in accordance with one embodiment, FIG. 4 B illustrates the interleaving of luminance and chrominance information in accordance with a second embodiment in which page organized memory is utilized.

DETAILED DESCRIPTION

Figure 1:
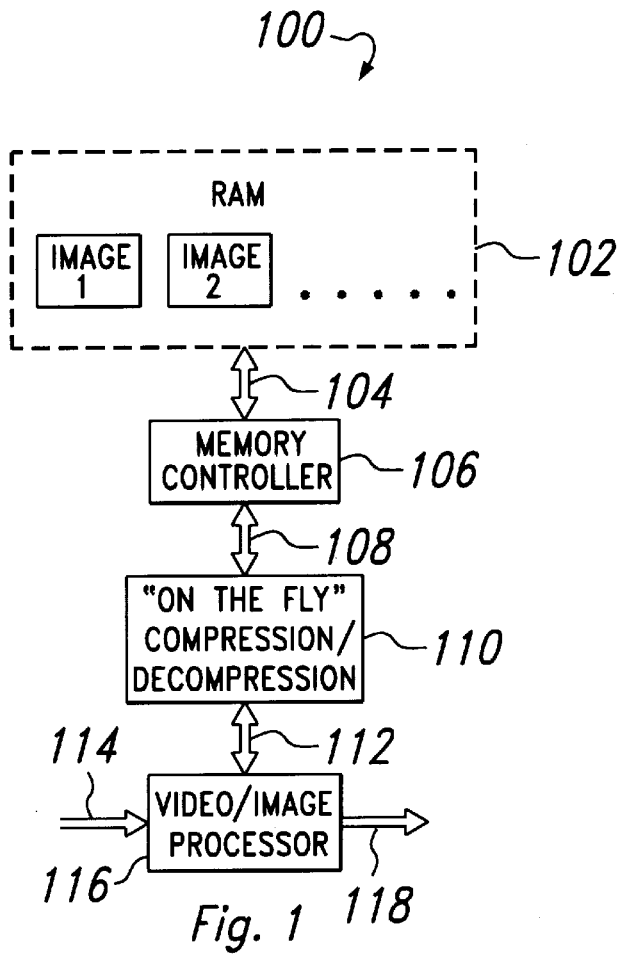
FIG. 1 is a block diagram of a system in accordance with the present invention.

FIG. 1 shows a video image processing system generally as 100. The video image processing system comprises a source of video images on bus 114 which would input into video/image processor 116. Video image processor 116 performs the decoding according to the prescribed standard, such as MPEG-2. The decoded pictures are then output on bus 118 to a display (not shown). In accordance with the present invention, the images that need to be stored in order to decode the pictures in accordance with the MPEG-2 standard, for example, are output on bi-directional bus 112 to "on the fly" compression/decompression circuit 110. The images are then compressed in accordance with the teachings of the present invention and output on bi-directional bus 108 to memory controller 106. Memory controller 106 then addresses RAM memory 102 via bi-directional bus 104 and transfers the compressed image to be stored in the memory 102.

Conversely, as a particular image or a portion of a particular image is needed to decode an input image, the necessary portion is fed from memory 102 via bi-directional bus 104 under the control of memory controller 106 in accordance with the control scheme of the present invention. The video data is then output on bi-directional bus 108 into the decompression portion of the "on the fly" compression/decompression circuit 110 which decompresses the data in accordance of the teachings of the present invention and outputs the result on bi-directional bus 112. Information on bus 112 is input to the video/image processor 116 for use in decoding the next image in accordance with the MPEG-2 standard, for example. The decoded image is then output on bus 118 to the display (not shown).

Figure 2:
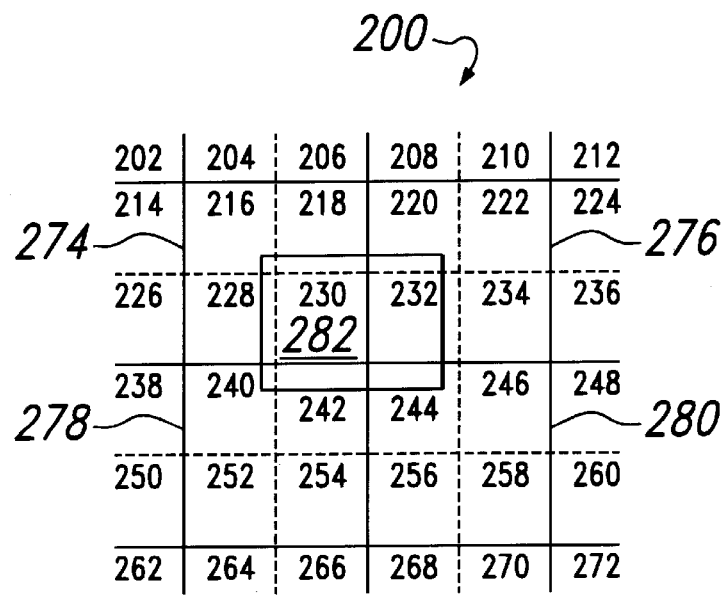
FIG. 2 shows the block and macroblock layout of a picture and an area to be utilized for motion compensation in a picture encoded in accordance with the MPEG-2 standard.

FIG. 2 shows a representation of a portion of a video image 200 which has been encoded in accordance with the MPEG-2 standard. FIG. 2 illustrates the encoded luminance signal only. The portion of the picture is arranged in a series of blocks 202, 204, 206, 208, 210, 212, 214, 216, 218, 220, 222, 224, 226, 228, 230, 232, 234, 236, 238, 240, 242, 244, 246, 248, 250, 252, 254, 256, 258, 260, 262, 264, 266, 268, 270 and 272. Blocks 202–212, 214, 224, 226, 236, 238, 248, 250, 260, 262–272 are shown in part only. Groups of four blocks are together known as macroblocks. Four macroblocks are shown in FIG. 2. Macroblock 274 comprises blocks 216, 218, 228 and 230. Macroblock 276 comprises blocks 220, 222, 232 and 234. Macroblock 278 comprises blocks 240, 242, 252 and 254 and Macroblock 280 comprises blocks 244, 246, 256 and 258. The remaining blocks shown in FIG. 2 are parts of other macroblocks (not shown).

In the example illustrated in FIG. 2, each block, such as 216, is a square comprising 8 by 8 pixels (also referred to as pels in the MPEG standard). Other possible arrangements of pixels can be used. In FIG. 2, the blocks are separated from each other by dashed lines; whereas, the macroblocks are separated from each other by the solid lines.

Figures 3A, 3B:
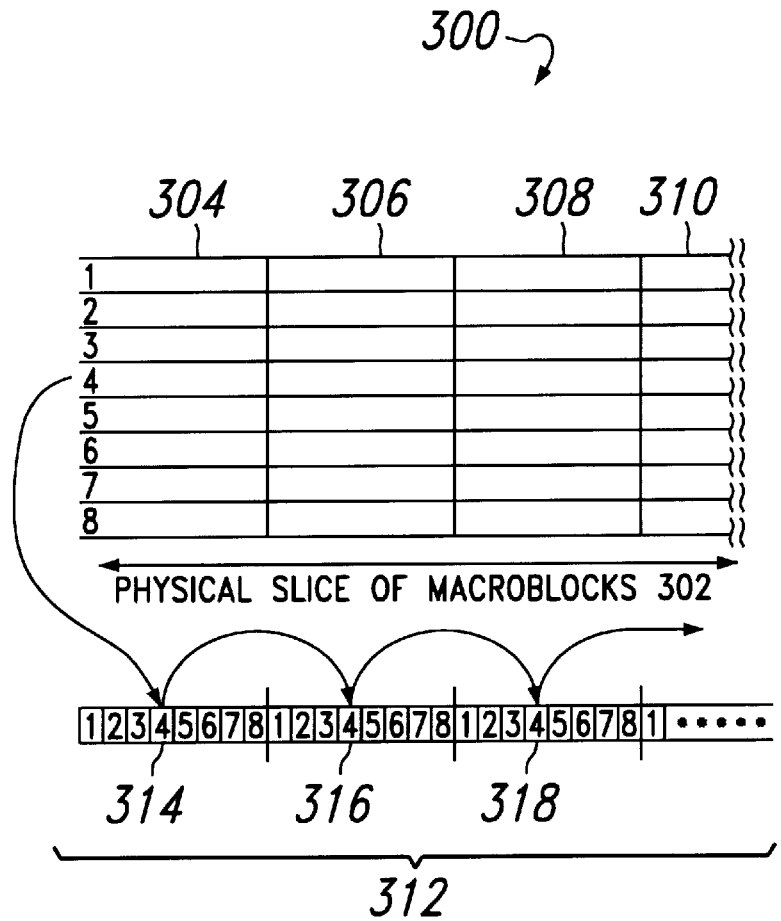
FIG. 3 A shows diagramatically how luminance data is stored for a B picture encoded in accordance with the MPEG-2 standard, FIG. 3 B shows an array pointer table utilized in connection with the technique illustrated in FIG. 3 A.

The encoding technique that can be utilized is dependent upon the type of picture that is to be encoded. B pictures are more easily compressed because it is not necessary to refer to these pictures for predicting other pictures in accordance with the MPEG-2 standard, for example. The first technique that will be described is applicable to B pictures only. FIG. 3A shows a pictorial representation 300 of the encoding technique that can be utilized. Element 302 of FIG. 3A represents a portion of a physical slice of macroblocks of a B picture. The term "physical slice of macroblocks" is defined as a row of macroblocks extending horizontally across the image from the left hand side to the right hand side of the image. B pictures are transmitted macroblock by macroblock. However, images are displayed line by line. It is advantageous to encode the B pictures on a line by line basis so that they can easily be displayed. As illustrated in FIG. 3, each of the macroblocks 304, 306, 308 and 310 represent four blocks such as 216, 218, 228 and 230 of FIG. 2. However, each macroblock represents a portion of either a frame or a field of a video picture. In view of the fact that the pictures are displayed field by field, the compression technique of the present invention stores the images on a field by field basis. Thus, for a frame picture the macroblocks 304, 306, 308 and 310 comprise sixteen pixels horizontally, they only comprise eight rows vertically corresponding to the eight lines of the field that is to be displayed. For a field picture, the macroblocks 304, 306, 308 and 310 comprise sixteen pixels in both horizontal and vertical dimension.

In a preferred embodiment of the present invention, the information for each of the pixels is compressed by a lossless linear predictive coding technique such as taking the difference between the pixels along a row. This differential information is then encoded by a Huffman encoding technique in which the differences which appear the most are given the lowest number in the Huffman sequence so as to comprise the fewest number of bits. Such techniques are well known in the art and need not be described in detail here. It should be noted that other compression techniques are also applicable to the present invention. The pixel information can be compressed using multiple pixels to generate a differential information or the information can be encoded by combining pixels from more than a single row, for example. The technique described herein should not be read as being limited to compressing the pixels within a single macroblock. The compressed information can be stored using different coding techniques than Huffman coding, for example, arithmetic coding.

The coded pixel information is then combined into words which may be, for example, 16 bits in length. If the coded information for the fourth line of macroblock 304, as illustrated in FIG. 3A, is reduced to 35 bits, for example, this information would then fill two complete words and have 3 bits which would then be placed into a third word which would comprise bits from the next macroblock as well. In order to store these words and be able to read them back on a line by line basis, a memory 312 is addressed as a linear array. As is well known to those skilled in the art, these memory arrays which are RAMs can be considered linear arrays having an address starting at 0 and progressing linearly through its maximum address. The array is broken into groups of eight words which in this example are each 16 bits (2 bytes) long. Other word lengths can be utilized as a matter of design choice. The grouping of the words by factor 8 is to match the eight lines of the field for each frame macroblock. The first 16 bits of the encoded pixel data are stored in the fourth word of the first segment, illustrated as element 314, of memory array 312. The next 16 bits are stored in the fourth word of the next segment of the memory 312, illustrated as element 316 in FIG. 3A. The remaining 3 bits will be incorporated into the bits stored in the fourth word of the third segment of memory array 312, illustrated as 310 in FIG. 3A In order to maximize compression, the compression continues to cross the macroblock dividing lines between macroblock 304 and 306. In order to perform this compression, it is necessary to store the information contained in the table shown in FIG. 3B. The table in FIG. 3B contains eight rows, one for each row of the macroblock. Each row contains three fields of information. The first field of information 352 contains the address of where the row ended. Field 354 contains the "dangle bit", that is the three bits that were "left over" when the first two words 314, through 316 were filled. The field 356 contains the pixel value of the last pixel for which the data was compressed. This is necessary in order that the difference between this pixel value and the first pixel value on the fourth row of macroblock 306 be computed so that the compression can continue. If the compression involves more than a single pixel, or pixels from additional rows, then the address and pixel value information must also be stored. The process continues row by row for each of the eight rows in the macroblock 304. The process then proceeds to compress the data in macroblock 306, utilizing the data stored in the table shown in FIG. 3B to continue the compression and to complete the uncompleted words utilizing the dangle bits from that row in macroblock 304. The process continues until the entire physical slice of the picture has been encoded into the memory. Preferably, the next physical slice of the picture is stored in the next available space for each row within the memory.

When the time comes to display a particular line of the field of an image, this can easily be accomplished because of the way which the data was stored in the memory array. For example, in order to display the fourth line of the image it is necessary to read out the fourth words 314, 316, 318 . . . for each of the eight word segments of memory array 312. The data will be read out sequentially in a compressed form which can then be decompressed by utilizing the inverse of the compression technique on the serial bit stream to generate a serial bit stream for the entire line to be displayed on the display.

As previously stated, FIGS. 3A and 3B show the encoding of luminance data only. There is less chrominance data because the chrominance is sampled less often than the luminance data. For example, in 4:2:0 encoding, there will be only half as much chrominance data as there is luminance data. Because the chrominace data and luminance data will be encoded differently, interweaving the chrominace data into the luminance data can lead to gaps in the memory if the encoded chrominace data terminates earlier than the encoded luminance data, for example. This would result in less efficient utilization of the space in the memory array. One encoding technique is shown in FIG. 4A. In this encoding technique, the luminance data for line one is labeled $L_1$, $L_2$, etc. The chrominance data appears as $C_{R1}$, $C_{R2}$, $C_{R3}$, $C_{R4}$, $C_{B1}$, $C_{B2}$, $C_{B3}$, $C_{B4}$. As shown in FIG. 4, the chrominance data is interweaved in the memory in between two sets of luminance data. For example, luminance sequences 402 and 404 are followed by chrominance sequence 406 which is in turn is followed by luminance sequences 408 and 410 followed by chrominance sequence 412. As can be seem from FIG. 4A, the slot in the memory array from sequence 402 to sequence 404 is computed by adding 8 whereas the slot in the memory array in sequence 408 is computed by adding 16 to the address of sequence 404 in order to account for the chrominance sequence 406 which intervenes. With the chrominance sequence, the address jump from sequence 406 to sequence 412 is computed by adding 24 to the address in sequence 406 in order to account for the two intervening luminance sequences 408 and 410.

FIG. 4B shows an alternate arrangement 450 for utilization with memory which is arranged in pages, such as in SDRAM memories. Eight pages of memory are shown in FIG. 4B. The first page 452 contains luminance lines $L_1$, $L_2$, $L_3$, $L_4$ as well as chrominance lines $C_{R1}$ and $C_{R2}$. The second page contains luminance lines $L_5$, $L_6$, $L_7$ and $L_8$ as well as chrominance lines $C_{B1}$ and $C_{B2}$. A third page 456 contains luminance lines $L_1$, $L_2$, $L_3$ and $L_4$ and chrominance lines $C_{R3}$, and $C_{R4}$. The fourth page 458 contains luminance lines $L_5$, $L_6$, $L_7$ and $L_8$ and chrominance lines $C_{B3}$, $C_{B4}$. The fifth page 460 contains luminance lines $L_1$, $L_2$, $L_3$ and $L_4$ and chrominance lines $C_{R1}$, $C_{R2}$. The sixth page 462 contains luminance lines $L_5$, $L_6$, $L_7$ and $L_8$ and chrominance lines $C_{B1}$, $C_{B2}$. The seventh page 464 contains luminance lines $L_1$, $L_2$, $L_3$ and $L_4$ and chrominance lines $C_{R3}$, $C_{R4}$. The eighth page 466 contains luminance lines $L_5$, $L_6$, $L_7$ and $L_8$ and chrominance lines $C_{B3}$, $C_{B4}$. As shown, there are six lines stored on each page. The pages are two dimensional in nature; the number of lines stored per page depends upon the arrangement of the memory array. The jump from line $L_4$ on the first page 452 to the third page 456 is 12 and the same 12 slots difference exist between page 456 and 460 and 460 and page 464. Thus there is no difference in the jump from memory location to memory location as shown in FIG. 4A. The chrominance signals which appear half as often, have a jump of 24 between chrominance slots as shown between chrominance $C_{R4}$ on page 456 and $C_{R4}$ on page 464.

The technique described above for storing B pictures is not usable for storing I or P pictures because of the need to be able to retrieve portions of the stored pictures for use in motion compensation of P or B pictures. Referring back to FIG. 2, area 282 is a block of data which must be retrieved in order to do motion compensation for a P or B picture in accordance with the MPEG-2 standard, for example. The area 282 is normally larger than one of the blocks such as 216 because it is common to make use of half pixel interpolation for motion compensation. In half pixel interpolation, the data points are chosen to simulate a point between pixels; the data point does not actually exist, but is constructed by interpolating the data for the two adjacent pixels. This provides a better fit and only requires an additional bit of address information. It does, however, require an additional column and an additional row larger than a block in the area 282. The area 282 can be anywhere within the stored picture, and need not necessarily line up with the boundaries for macroblocks or blocks of the picture. As shown in FIG. 2, the area 282 comprises a portion of blocks 216, 218, 220, 228, 230, 232, 240, 242 and 244. If the picture was stored across the width of the display, as done for B pictures, it would not be possible to retrieve the data that only corresponds to the desired blocks. It should be noted that since B pictures can never be used for motion compensation of another picture, this problem does not exist when storing B pictures which allows for the technique described above to be utilized.

Accordingly, a different technique is necessary for storing I or P pictures. These pictures can be stored by compressing the video data on a row by row basis using a lossless linear predictive coding technique. This can be one of the linear predictive coding techniques described above in connection with storing B pictures. The difference is that the data is stored row by row within each block of the MPEG-2 picture and in that block boundaries are added to the stored information. The block boundaries are stored in a separate pointer table which points to the beginning of each block within the stored picture. Thus it becomes possible to locate the beginning of each block when it is necessary to retrieve a portion of the picture for motion compensation. Accordingly, for the motion compensation illustrated as area 282 in FIG. 2, it will be necessary to retrieve and decode the picture data for blocks 216, 218, 220, 228, 230, 232, 240, 242 and 244 in order that the data need for the area 282 be available. It would also be possible to use a half block data in place of full block data in the above described process so that only a portion of the block need be retrieved and decoded in order to produce the data when the entire block is not necessary, for example when the data for block 216 is to be retrieved. This produces a more efficient process. An example of half block processing is storing field data separately within frame data. In the above example, the macroblock has been divided into local areas of blocks or half-blocks. In general, the choice of the division of the macroblock into various local areas is a design choice. It should be noted that other compression techniques are also applicable to the present invention. The pixel information can be compressed using multiple pixels to generate a differential information or the information can be encoded by combining pixels from more than a single row, for example. The technique described herein should not be read as being limited to compressing the pixels within a single macroblock. The compressed information can be stored using different coding techniques than Huffman coding, for example, arithmetic coding. Once the necessary blocks have been decoded and the information needed for the motion compensation area 282 have been computed, they can be processed in accordance with known MPEG-2 techniques, for example.

Displaying pictures stored by this compression technique require a row by row data flow as with B pictures. In order to obtain this row by row data flow, it is necessary to either decode each block needed for that row, extract information for that row and discard the unneeded information each time a row is to be displayed or store the information that is represented by that block until it is needed to display another row. In order to avoid having to decode the entire block again without having to store the complete block, a half block of information (or other suitable portion) could be stored. A pointer would be stored indicating the staring position of where the decoding process would start and the information necessary to start the decoding process, such as the last decoded pixel value, would be stored. The need to decode a block each time a row of data is needed and the need to store the pointers makes this technique slightly less efficient than the technique needed to store B pictures.

While a particular embodiment of the present invention has been disclosed herein, certain changes and modifications will readily occur to those skilled in the art. All such changes and modifications can be made without departing from the invention as defined by the appended claims.

What is claimed is:

1. In a method of decoding a video signal encoded in accordance with an MPEG standard which requires storing at least a portion of a B picture for later display, a method of storing video information comprising:

dynamically compressing video information for at least a portion of said B picture; and storing said dynamically compressed video information in a memory.

2. The method of claim 1 wherein said dynamic compression step comprises:

utilizing the decoded macroblock by macroblock picture data to generate data representative of a physical slice of said picture; and encoding said physical slice data utilizing a lossless predictive coding method.

3. In a method of decoding a video signal encoded in accordance with an MPEG standard which requires storing at least a portion of an I or P picture for later decoding, a method of storing video information comprising:

dynamically compressing video information for at least a portion of said I or P picture by encoding picture data utilizing a lossless predictive coding method on a local area by local area basis to generate encoded picture data, storing said dynamically compressed video information in a memory by storing said encoded picture data linearly in said memory; and generating and storing a pointer table of the beginning address of each local area.

4. Apparatus for storing decoded video information of a video signal encoded in accordance with an MPEG standard which requires storing at least a portion of a B picture for later display comprising:

a video signal processor for dynamically compressing video information for at least a portion of a reference picture; and a memory for storing said dynamically compressed video information.

5. The apparatus of claim 4 wherein said video signal processor comprises:

decoder means utilizing the decoded macroblock by macroblock picture data to generate data representative of a physical slice of said picture; and encoder means for encoding said physical slice data utilizing a lossless predictive coding method.

6. Apparatus for storing decoded video information of a video signal encoded in accordance with an MPEG standard which requires storing at least a portion of an I or a P picture for later decoding comprising:

a video signal processor for dynamically compressing video information for at least a portion of a reference picture, said video signal processor comprising encoding means for encoding picture data utilizing a lossless predictive coding method on a local area by local area basis to generate encoded picture data;

a memory for storing said dynamically compressed video information, said memory having said encoded picture data linearly stored; and means for generating and storing in said memory a pointer table of the beginning address of each local area.

7. In a method of decoding a video signal encoded in accordance with an MPEG standard, a method of storing B picture information comprising the steps of:

utilizing the decoded macroblock by macroblock picture data to generate data representative of a physical slice of said picture;

encoding said physical slice data utilizing a lossless predictive coding method to generate encoded picture data; and storing said encoded picture data linearly in a memory.

8. Apparatus for storing decoded video information for a B picture of a video signal encoded in accordance with an MPEG standard comprising:

a video signal processor utilizing the decoded macroblock by macroblock picture data to generate data representative of a physical slice of said picture;

an encoder encoding said physical slice data utilizing a lossless predictive coding method; and a memory storing said encoded picture data in a linear manner.

9. In a method of decoding a video signal encoded in accordance with an MPEG standard, a method of storing I of P picture information comprising the steps of:

encoding picture data utilizing a lossless predictive coding method on a block by block basis to generate encoded picture data;

storing said encoded picture data linearly in a memory; and generating and storing a pointer table of the beginning of data for each individual block.

10. Apparatus for storing decoded video information for an I or P picture of a video signal encoded in accordance with an MPEG standard;

an encoder encoding picture data utilizing a lossless predictive coding method on a block by block basis to generate encoded picture data;

A memory storing said encoded picture data in a linear manner; and a processor generating and storing a pointer table of the beginning of data for each individual block.

11. In a method of decoding a video signal encoded in accordance with a standard, a method of storing a picture for later display comprising the steps of:

utilizing the decoded macroblock by macroblock picture data to generate data representative of a physical slice of said picture;

encoding said physical slice data utilizing a lossless predictive coding method to generate encoded picture data; and storing said encoded picture data linearly in a memory.

12. Apparatus for storing decoded video information for a picture of a video signal encoded in accordance with a standard for later display comprising:

a video signal processor utilizing the decoded macroblock by macroblock picture data to generate data representative of a physical slice of said picture;

an encoder encoding said physical slice data utilizing a lossless predictive coding method; and a memory storing said encoded picture data in a linear manner.

* * * * *